(12) United States Patent
Tong et al.

(10) Patent No.: US 8,305,949 B2
(45) Date of Patent: Nov. 6, 2012

(54) SYSTEM AND METHOD FOR SPATIAL MULTIPLEXING-BASED OFDM BROADCAST/MULTICAST TRANSMISSION

(75) Inventors: Wen Tong, Ottawa (CA); Jianglei Ma, Kanata (CA); Mo-Han Fong, Ottawa (CA); Peiying Zhu, Kanata (CA); Aaron Callard, Ottawa (CA)

(73) Assignee: Apple Inc., Cupertino, CA (US)

( * ) Notice: Subject to any disclaimer, the term of this patent is extended or adjusted under 35 U.S.C. 154(b) by 466 days.

(21) Appl. No.: 12/440,879

(22) PCT Filed: Sep. 11, 2007

(86) PCT No.: PCT/CA2007/001574
§ 371 (c)(1),
(2), (4) Date: Jun. 29, 2009

(87) PCT Pub. No.: WO2008/031198
PCT Pub. Date: Mar. 20, 2008

(65) Prior Publication Data
US 2011/0149824 A1    Jun. 23, 2011

Related U.S. Application Data (60) Provisional application No. 60/825,213, filed on Sep. 11, 2006.

(51) Int. Cl.
*H04H 20/71* (2008.01)
(52) U.S. Cl. ...................................................... 370/312
(58) Field of Classification Search ................. None
See application file for complete search history.

(56) References Cited

U.S. PATENT DOCUMENTS

| 7,139,305 | B2 * | 11/2006 | Gavnoudias et al. | 375/147 |
|---|---|---|---|---|
| 2002/0105947 | A1 * | 8/2002 | Kitagawa et al. | 370/366 |
| 2005/0085195 | A1 | 4/2005 | Tong et al. | |
| 2005/0113039 | A1 * | 5/2005 | Tsukamoto | 455/101 |
| 2006/0039344 | A1 | 2/2006 | Khan | |
| 2006/0067206 | A1 * | 3/2006 | Mantravadi et al. | 370/208 |
| 2006/0067417 | A1 * | 3/2006 | Park et al. | 375/260 |
| 2006/0264214 | A1 * | 11/2006 | Stanwood et al. | 455/433 |
| 2007/0002724 | A1 * | 1/2007 | Khan | 370/203 |
| 2007/0104151 | A1 | 5/2007 | Papasakellariou et al. | |
| 2007/0189289 | A1 | 8/2007 | Frederiksen et al. | |
| 2007/0232309 | A1 * | 10/2007 | Koszarsky | 455/436 |

FOREIGN PATENT DOCUMENTS

| EP | 0741466 A2 | 11/1996 |
|---|---|---|
| EP | 1677435 A2 | 7/2006 |
| WO | 2006/036759 A1 | 4/2006 |
| WO | 2007/037657 A2 | 4/2007 |

OTHER PUBLICATIONS

Khan, Farooq, "Broadcast Overlay on Unicast via Superposition Coding and Interference Cancellation," Proceedings of the IEEE 64th Vehicular Technology Conference, Sep. 2006, pp. 1-6, IEEE.
International Search Report for PCT/CA2007/0001574, mailed Dec. 28, 2007.
International Search Report for PCT/CA2008/000203 mailed Oct. 8, 2008, 5 pages.

* cited by examiner

*Primary Examiner* — John Blanton
(74) *Attorney, Agent, or Firm* — Meyertons, Hood, Kivlin, Kowert & Goetzel, P.C.

(57) ABSTRACT

A method of OFDM transmission/reception comprising: transmitting broadcast/multicast signals on a first antenna and unicast signals on a second antenna; segregating broadcast/multicast sub-channelization from unicast channels sub-channelization based on FDM (frequency division multiplexing)/TDM (time division multiplexing) sub-channelization.

17 Claims, 6 Drawing Sheets

SYSTEM AND METHOD FOR SPATIAL MULTIPLEXING-BASED OFDM BROADCAST/MULTICAST TRANSMISSION

RELATED APPLICATIONS

This application is a 35 USC 371 national phase application of PCT/CA2007/001574 filed Sep. 11, 2007, which claims the benefit of U.S. Provisional Application No. 60/825,213 filed Sep. 11, 2006, the disclosures of which are incorporated herein by reference in their entireties.

FIELD OF THE INVENTION

The invention relates to OFDM transmission and reception with spatial multiplexing.

DETAILED DESCRIPTION OF THE PREFERRED EMBODIMENTS

In a SFN (single frequency network) OFDM network, a common set of OFDM subcarriers are in use throughout a network. It is noted that an SFN as described herein may be implemented in a context where other frequency resources are also used. However, that does not effect the allocation of resources within the common frequency resource that is being used to implement the SFN. For example, one OFDM band could be used to implement an SFN, and another band used with a frequency re-use scheme.

Spatial multiplexing can further improve the cell-edge coverage in an SFN. For example, a 2-branch transmit cell-site can be used with a spatial multiplexing transmission format. In the description that follows, 2 branch transmission and reception is assumed, but more generally, N-branch transmission and reception is contemplated.

This involves two-layer transmission (using two transmit antennas) at the AN (access node) and reception by at least two receive antennas at the AT (access terminal). In some embodiments, AT are provided that have with multiple antennas that are greater in number than the number of transmit antennas in the AN. For some such AN, for example a receive-only AT (e.g. broadcast/multicast function only), further enhancement can be achieved by performing a MIMO antenna switching technique to select a subset of this greater number of antennas that gives the best reception.

Broadcast/Multicast and Unicast Channel Structure

One embodiment of the invention provides for the segregation of broadcast/multicast vs. unicast channels based on FDM (frequency division multiplexing)/TDM (time division multiplexing) sub-channelization. In other words, sub-channels that use different sub-carriers/transmission intervals are defined for broadcast/multicast as opposed to unicast.

Another embodiment of the invention provides for the superposition of broadcast vs. unicast channels on the same FDM/TDM sub-channelization.

In both cases, any sub-channelization approach can be employed to define sub-channels within the two dimensional OFDM resource (sub-carriers in frequency×OFDM symbol durations in time).

In some embodiments, for the segregation arrangement, the sub-channels for broadcast/multicast can have completely different parameters than the sub-channels for unicast, for example in terms of the FFT size, sub-carrier separation and number of data tones.

In some embodiments, for the superposition arrangement, the sub-channels for broadcast/multicast is implemented using the same parameters as for the sub-channels used for unicast, for example by using an identical sub-channel structure.

Figure 6:
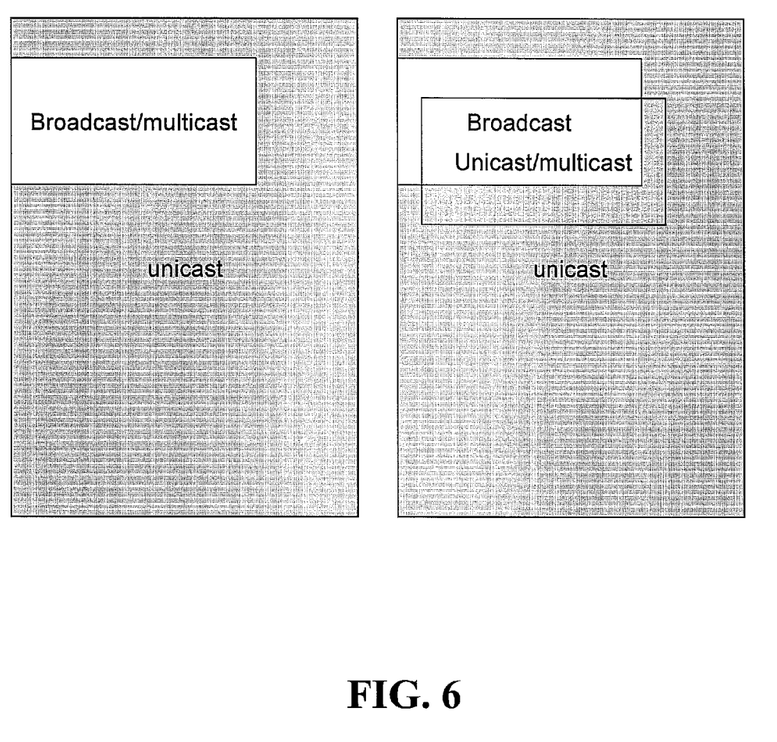
FIG. 6 is a block diagram illustrating a simplified view of the differences between superposition and segregation of sub-channels for broadcast/multicast.

FIG. 6 shows a very simplified view of the difference between the two approaches. In the left side of the Figure, the segregation approach is illustrated; sub-channelization for broadcast/multicast transmitted by the first antenna is performed using a distinct resource from that used for unicast transmitted by the second antenna.

In the right side of the Figure, the superposition approach is illustrated; sub-channelization for broadcast transmitted by the first antenna is performed using a resource that overlaps with that used for unicast transmitted by the second antenna. In the area of overlap, the second antenna is used to transmit multicast and unicast.

Segregation of Broadcast/Multicast vs. Unicast

AN Transmission of Two-Layer Broadcast/Multicast

In the following, a "layer" refers to a transmission signal that is transmitted from a single antenna. Two layer transmission involves transmission of a respective different signal from each of two transmit antennas. With two-layer transmission from each cell (or each sector in a sectorized implementation), the pilot and data for each layer constitutes an SFN transmission. Sufficient diversity is already achieved by the SFN macro-diversity transmission The use of additional spatial multiplexing is provided so as to further improve the cell-edge throughput.

Broadcast/multicast zones are defined with common MIMO pilots location, a zone being defined as a subset of an available OFDM transmission resource. A first antenna is enabled for the first layer referred to as the primary layer transmission and a second antenna is enabled for the second layer referred to as the secondary layer transmission. The secondary layer transmission may not be enabled for every sector. The secondary layer transmits using zones that do not interfere with the zones defined for broadcast/multicast, hence the overall approach being referred to as a segregation approach.

In some embodiments, the primary layer transmits broadcast/multicast traffic to all coverage areas while the secondary layer transmits unicast traffic only to the particular coverage area that needs to receive it and when it needs to receive it. Broadcast traffic is for reception by all access terminals, multicast traffic is for multiple access terminals, and unicast traffic is for individual access terminals. In another example, the primary layer is used to transmit wide area traffic and the secondary layer is used to transmit local area traffic.

Figure 1:
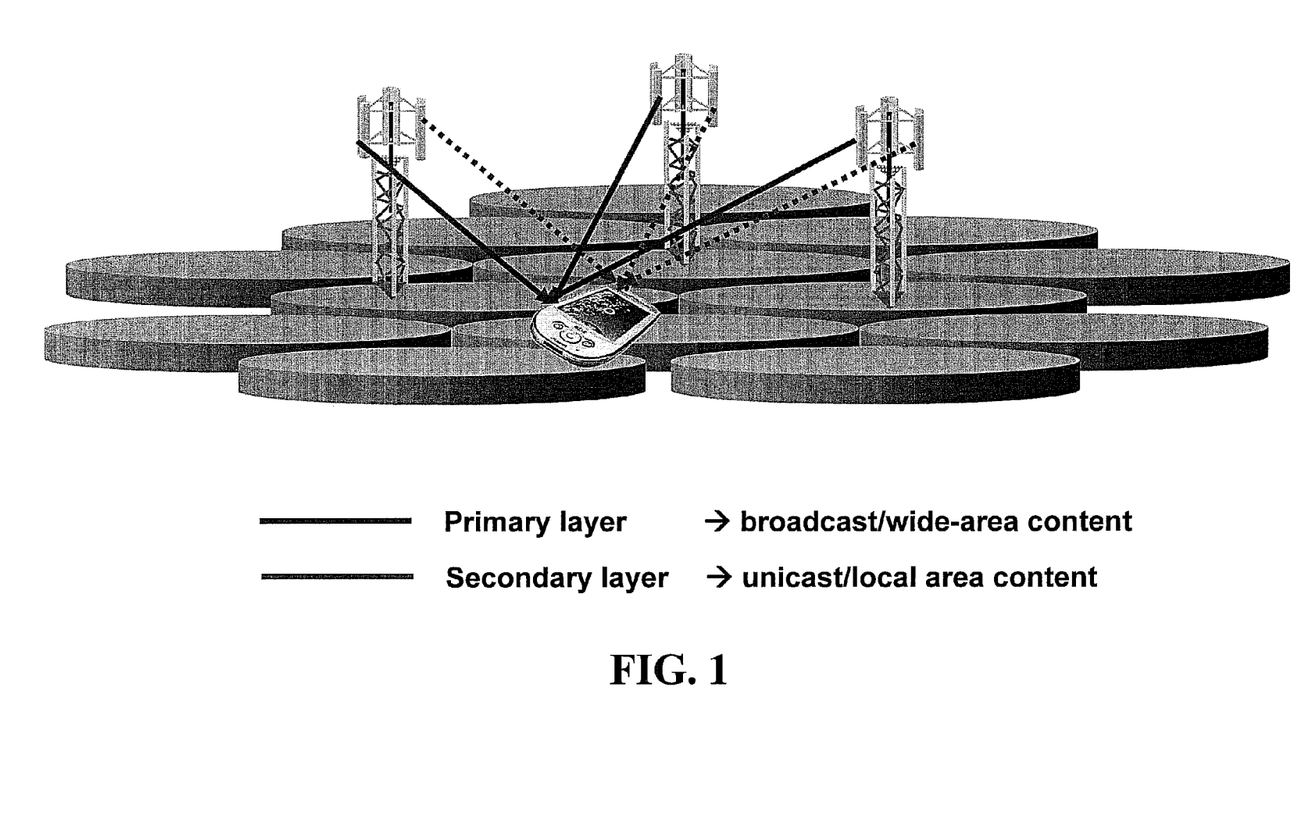
FIG. 1 is a simplified system diagram showing a set of access terminals performing wireless communication.

FIG. 1 depicts a simplified system diagram showing a set of AT transmitting on two transmit antennas, with both primary layer and secondary layer transmissions being shown.

Depending upon its position, a given AT may receive the transmissions of multiple AN.

AT Reception of Two-Layer Broadcast/Multicast

The AT has at least two receive antennas and performs spatial multiplexing decoding. The AT processes the MIMO pilots to detect the single layer transmission or two layer transmission. Basic reception of the two-layer transmission can be achieved by a two-branch receiver at the AT with spatial multiplexing capability.

Some embodiments provide for enhanced reception for the two-layer receiver. In some implementations, additional reception radio chains and antennas are provided beyond the minimum (two for the two transmit antenna case). This might be used for receive-only AT with only broadcast/multicast function.

In other implementations, additional antennas are provided, but additional reception radio chains are not, and MIMO Antenna Selection is performed to select appropriate antennas for reception out of the available antennas. There are more antennas available than there are receive radio chains. Increasing the receive diversity order in this manner can further improve the coverage. A simple antenna selection mechanism can be employed, for example one that is CRC driven.

Figure 2:
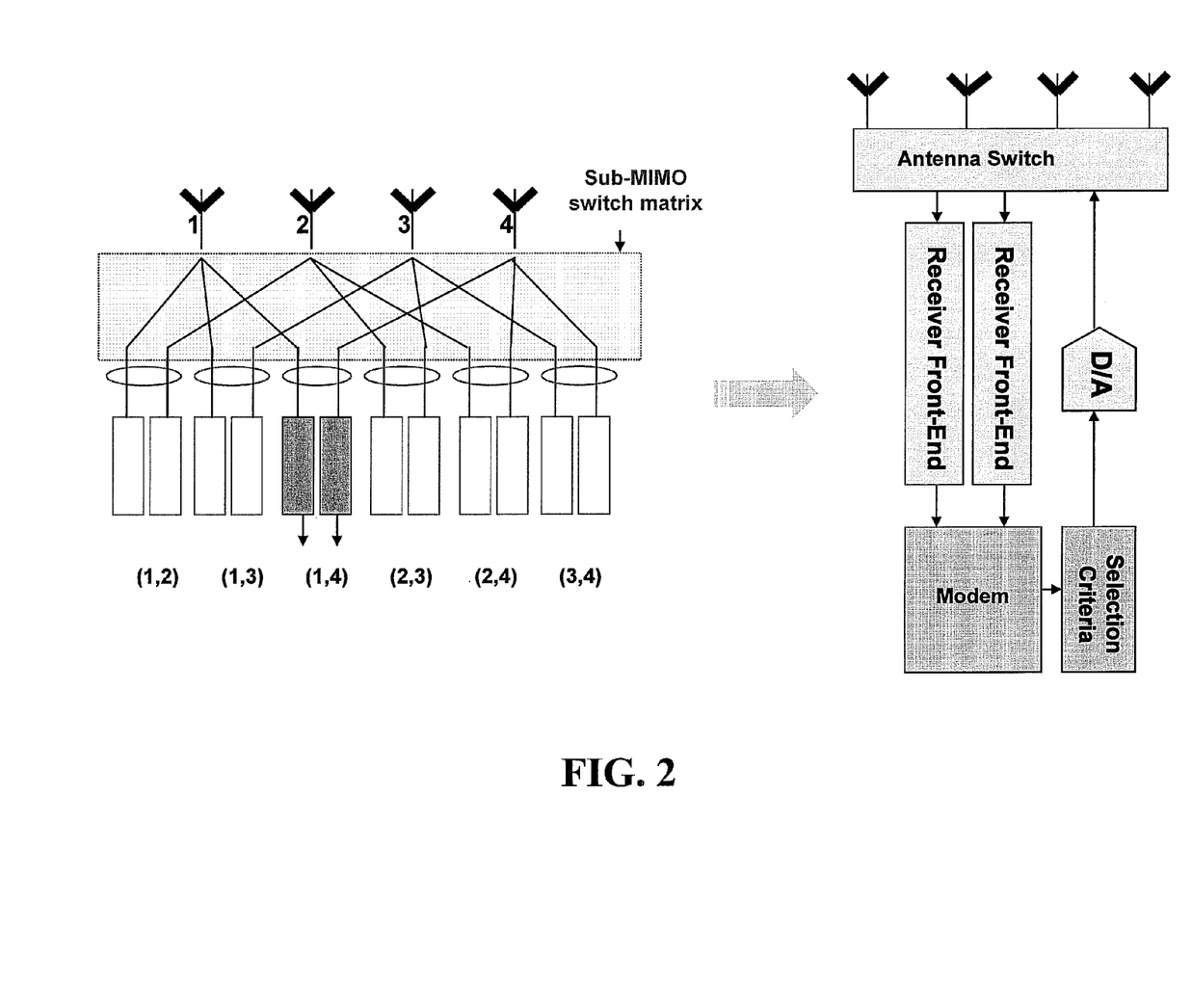
FIG. 2 is a block diagram of an exemplary access terminal.

FIG. 2 is a block diagram of an example AT. Shown is a set of four antennas connected to an antenna switch (sub-MIMO switch matrix). In the example depicted, there are four receive antennas, and the antenna switch is used to switch two of the antennas to respective receiver front ends. Also shown is a selection feedback connection that involves processing signals at the modem, looking at selection criteria, and adjusting the antenna switch accordingly. For the four antenna case, there are six different permutations of two receive antennas, and at the instant depicted, the first and fourth receive antennas have been selected.

Transmission Signal Scheduling to Enable AT Antenna Switching

Figure 3:
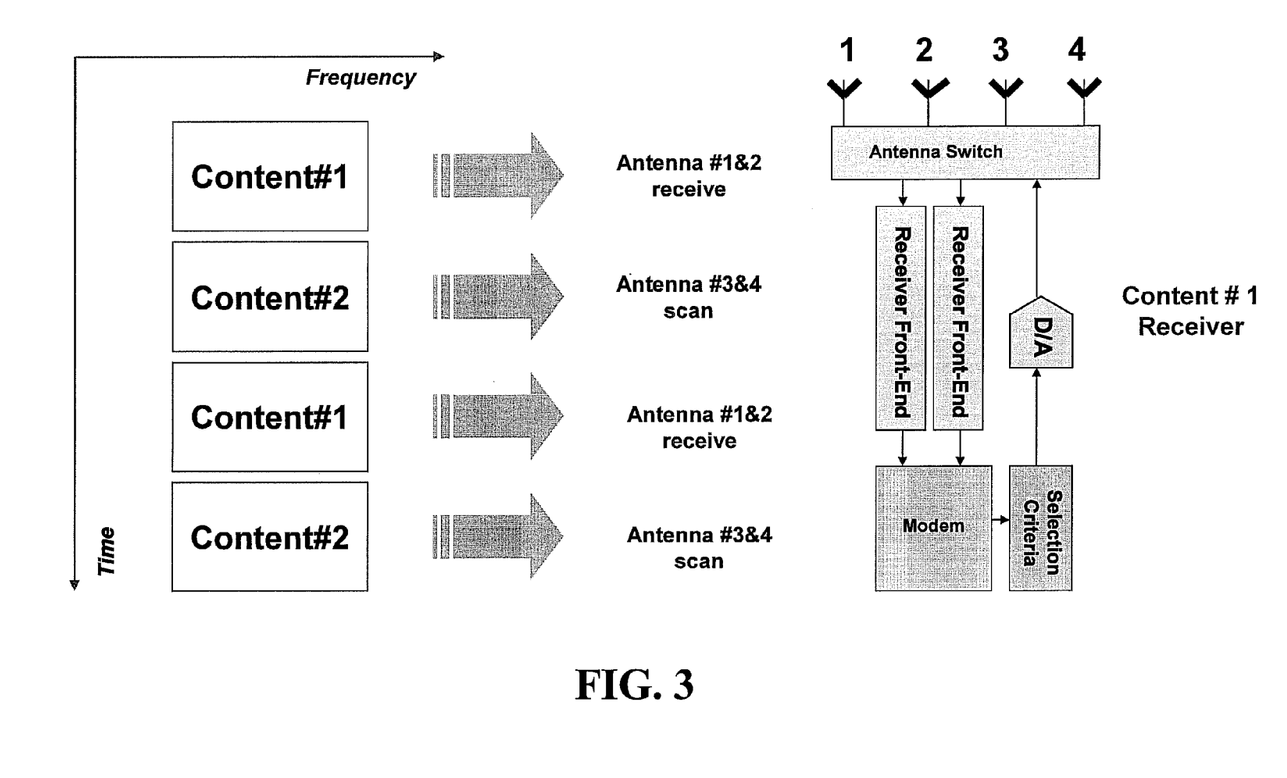
FIG. 3 is an exemplary diagram illustrating a receiver receiving wireless data

With reference again to FIG. 2, it can be seen that while two of the four antennas are connected to the receiver front ends, channel conditions for those antennas can be determined, but channel conditions for the other two antennas cannot be determined. In some embodiments, the content for a given receiver (broadcast or multicast) is decimated in time into several time slots in such a manner to allow a given receiver time between portions of their content to switch over to the other antennas, determine channel quality, and make an antenna selection decision. This is depicted in FIG. 3. Here, the transmit content is shown divided into content #1 and content #2. Over time, the transmission alternates between content #1 and content #2. Also shown is a receiver that is looking only at content #1, referred to as "content#1 receiver". While the receiver is receiving its content on two antennas (1 and 2 in the illustrated example) it is measuring channel conditions to those antennas. While the receiver is receiving content #2, which it is not interested in, it switches its antennas to antennas 3 and 4 and measures channel conditions. Before it is time to receive content #1 again, the AT makes a decision on which antennas to use for the next receive period.

Superposition of Broadcast/Multicast vs. Unicast

AN Transmission of Two-Layer Broadcast/Unicast

In another embodiment, two-layer transmission from each transmitter is again employed. The first layer is used for broadcast and constitutes an SFN transmission, and the second layer is for unicast transmission. Sufficient diversity is achieved by the SFN macro-diversity transmission. The first layer may be transmitted in a manner that allows robust and reliable reception. In some embodiments, a SIC (successive interference canceller) receiver is used to demodulate the second layer. The resources that are used for broadcast may overlap with resources used for unicast. In some embodiments, in the area of overlap, one area is used for broadcast and the other is used for unicast/multicast. The remaining resource is used for unicast.

The first-layer and second-layer transmit orthogonal pilots to enable receivers to perform layer separation. In some embodiments, the first layer is frequency reuse=1 and the secondary layer transmission is frequency reuse=1. In other embodiments, the first layer is frequency reuse=1 and the secondary layer transmission is frequency reuse>1. If reuse=1, the entire network uses the same frequency bands (→SNF case). If reuse>1, then different bands are assigned to different sectors.

Figure 4:
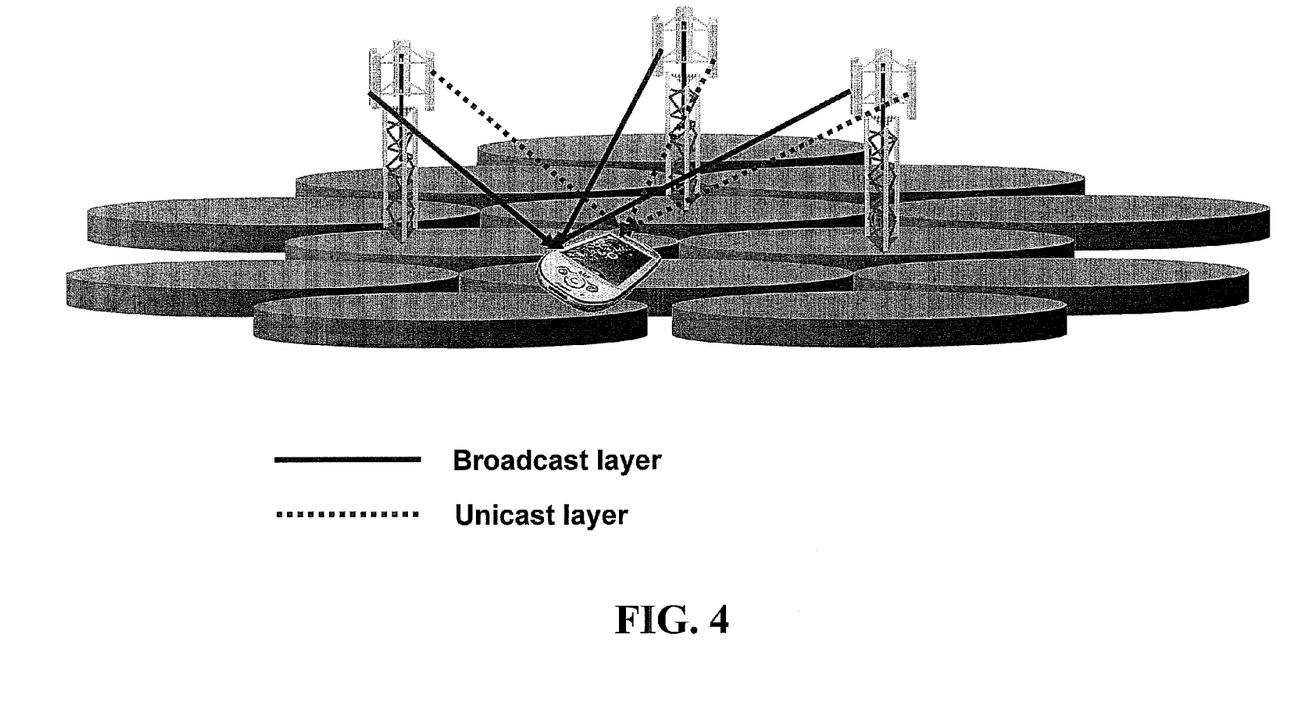
FIG. 4 is a simplified system diagram showing a set of access terminals performing wireless communication.

FIG. 4 depicts a simplified system diagram showing a set of AT transmitting on two transmit antennas, with both broadcast layer and multicast layer transmissions being shown. Depending upon its position, a given AT may receive the transmissions of multiple AN.

AT Reception of Two-Layer Broadcast/Unicast

The AT has at least two receive antennas and spatial multiplexing/SIC decoding hardware. The AT processes the MIMO pilots to detect the single layer transmission or two layer transmission.

Basic reception of the two-layer transmission can be achieved by a two-branch receiver at the AT with spatial multiplexing/SIC capability.

In some embodiments, additional antennas are provided to allow antenna selection diversity at the receiver. There might be additional receive chains, or there may be more antennas available than there are receive radio chains. Increasing the receive diversity order can be used to further improve the coverage.

Design to Enable Unicast AT Antenna Switching

Figure 5:
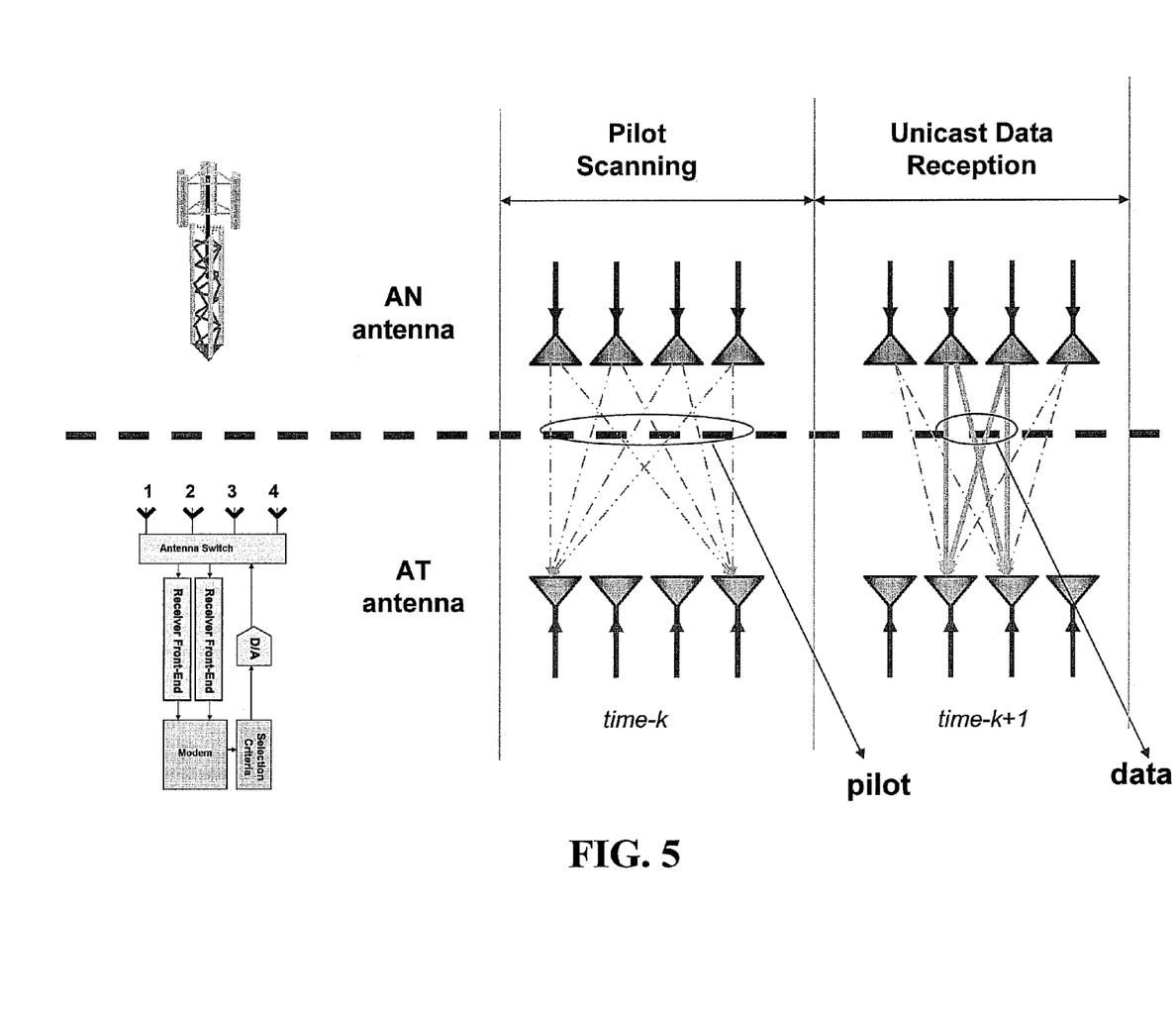
FIG. 5 is an exemplary diagram illustrating communication between a transmitter and receiver, each with multiple antennas.

In some embodiments, in addition to/alternative to unicast AT antenna switching, the unicast data is sent using a subset of an available set of antennas at the AN. An example is depicted in FIG. 5. Here, the AN has four antennas, and the AT has four antennas, but only two antennas are going to be used for a given unicast transmission. Thus, antenna selection can take place both at the transmitter and the receiver. In the illustrated example, at time-k, the transmitter transmits pilots on all four pilots, and the receiver receives them on two antennas (assuming it has only two receive chains), and performs pilot measurement for all of the transmit antennas, but for the particular receive antennas. At time k+1, the unicast transmission is taking place only on two transmit antennas, and reception is taking place only on two receive antennas. However, the other transmit antennas are still transmitting pilots. With the combined transmit structure of time k and time k+1, all of the pilots are transmitted and received by every permutation of transmit antennas and receive antennas, and an appropriate selection of the antennas to use for the next unicast transmission and reception can be made. This requires feedback signalling to the transmitter in order to signal the use of the proper antennas for the unicast data transmission.

Numerous modifications and variations of the present invention are possible in light of the above teachings. It is therefore to be understood that within the scope of the appended claims, the invention may be practiced otherwise than as specifically described herein.

We claim:
1. A method of OFDM transmission/reception comprising:
transmitting broadcast/multicast signals on a first antenna and unicast signals on a second antenna;
segregating broadcast/multicast sub-channelization from unicast channels sub-channelization based on FDM (frequency division multiplexing)/TDM (time division multiplexing) sub-channelization;
wherein antenna selection is performed at a receiver to select a number of antennas equal to the number of transmit antennas.

2. The method of claim 1, wherein the sub-channels for broadcast/multicast have different parameters than the sub-channels for unicast.

3. The method of claim 2, wherein the different parameters for the sub-channels for broadcast/multicast comprise one or more of the following: FFT size, sub-carrier separation and number of data tones.

4. The method of claim 1, further comprising:
transmitting a unicast signal to a given receiver with gaps left to allow the receiver to switch to other antennas to perform channel estimation, so as to allow antenna selection to be performed.

5. A method of OFDM transmission/reception comprising:
transmitting broadcast signals on a first antenna and unicast signals on a second antenna;
superimposing sub-channelization for broadcast on top of sub-channelization for unicast, wherein the sub-channels for broadcast are implemented using the same parameters as for the sub-channels used for unicast;
wherein antenna selection is performed at a receiver to select a number of antennas equal to the number of transmit antennas.

6. The method of claim 5, further comprising transmitting multicast signals and unicast signals on the second antenna in the area that is superimposed with broadcast signal transmission.

7. The method of claim 2, wherein using the same parameters as for the sub-channels used for unicast further comprises using an identical sub-channel structure.

8. The method of claim 5 further comprising:
transmitting a unicast signal to a given receiver with gaps left to allow the receiver to switch to other antennas to perform channel estimation, so as to allow antenna selection to be performed.

9. The method of claim 5, further comprising:
performing antenna selection at a transmitter to select a subset of an overall set of available antennas.

10. The method of claim 9, further comprising:
a receiver performing channel estimation for some transmit antennas while the receiver is not performing unicast data reception, and
performing channel estimation for other transmit antennas while the receiver is performing unicast data reception.

11. A method of OFDM transmission/reception comprising:
transmitting broadcast signals on a first antenna and unicast signals on a second antenna;
superimposing sub-channelization for broadcast on top of sub-channelization for unicast, wherein the sub-channels for broadcast are implemented using the same parameters as for the sub-channels used for unicast;
performing antenna selection at a transmitter to select a subset of an overall set of available antennas;
a receiver performing channel estimation for some transmit antennas while the receiver is not performing unicast data reception, and performing channel estimation for other transmit antennas while the receiver is performing unicast data reception.

12. A method, comprising:
performing antenna selection at a receiver to select a number of antennas equal to a number of transmit antennas;
receiving broadcast/multicast signals transmitted by a first antenna and unicast signals transmitted by a second antenna, wherein the broadcast/multicast sub-channelization is segregated from unicast channels sub-channelization based on FDM (frequency division multiplexing)/TDM (time division multiplexing) sub-channelization.

13. An access terminal, comprising:
a plurality of antennas for receiving signals; and
circuitry coupled to the plurality of antennas, wherein the circuitry is configured to:
perform antenna selection of the plurality of antennas to select a number of antennas equal to a number of transmit antennas;
receive, using at least one of the plurality of antennas, broadcast/multicast signals transmitted by a first antenna and unicast signals transmitted by a second antenna, wherein the broadcast/multicast sub-channelization is segregated from unicast channels sub-channelization based on FDM (frequency division multiplexing)/TDM (time division multiplexing) sub-channelization.

14. A method, comprising:
performing antenna selection at a receiver to select a number of antennas equal to a number of transmit antennas;
receiving broadcast signals transmitted by a first antenna and unicast signals transmitted by a second antenna, wherein the sub-channelization for broadcast is superimposed on top of sub-channelization for unicast, wherein the sub-channels for broadcast are implemented using the same parameters as for the sub-channels used for unicast.

15. An access terminal, comprising:
a plurality of antennas for receiving signals; and
circuitry coupled to the plurality of antennas, wherein the circuitry is configured to:
perform antenna selection of the plurality of antennas to select a number of antennas equal to a number of transmit antennas;
receive, using at least one of the plurality of antennas, broadcast signals transmitted by a first antenna and unicast signals transmitted by a second antenna, wherein the sub-channelization for broadcast is superimposed on top of sub-channelization for unicast, wherein the sub-channels for broadcast are implemented using the same parameters as for the sub-channels used for unicast.

16. A method, comprising:
receiving broadcast signals transmitted by a first antenna and unicast signals transmitted by a second antenna, wherein the sub-channelization for broadcast is superimposed on top of sub-channelization for unicast, wherein the sub-channels for broadcast are implemented using the same parameters as for the sub-channels used for unicast, and wherein the first and second antennas are selected from an overall set of available antennas; and
performing channel estimation for some transmit antennas while not performing unicast data reception; and
performing channel estimation for other transmit antennas while performing unicast data reception.

17. An access terminal, comprising:

a plurality of antennas for receiving signals; and circuitry coupled to the plurality of antennas, wherein the circuitry is configured to:

receive, using at least one of the plurality of antennas, broadcast signals transmitted by a first antenna and unicast signals transmitted by a second antenna, wherein the sub-channelization for broadcast is superimposed on top of sub-channelization for unicast, wherein the sub-channels for broadcast are implemented using the same parameters as for the sub-channels used for unicast, and wherein the first and second antennas are selected from an overall set of available antennas;

perform channel estimation for some transmit antennas while not performing unicast data reception; and     perform channel estimation for other transmit antennas while performing unicast data reception.

* * * * *